March 28, 1961     B. E. LEDERMAN ET AL     2,977,242
METHOD OF FILLING THE PORES OF WOOD AND RESULTANT ARTICLE
Filed Dec. 22, 1952
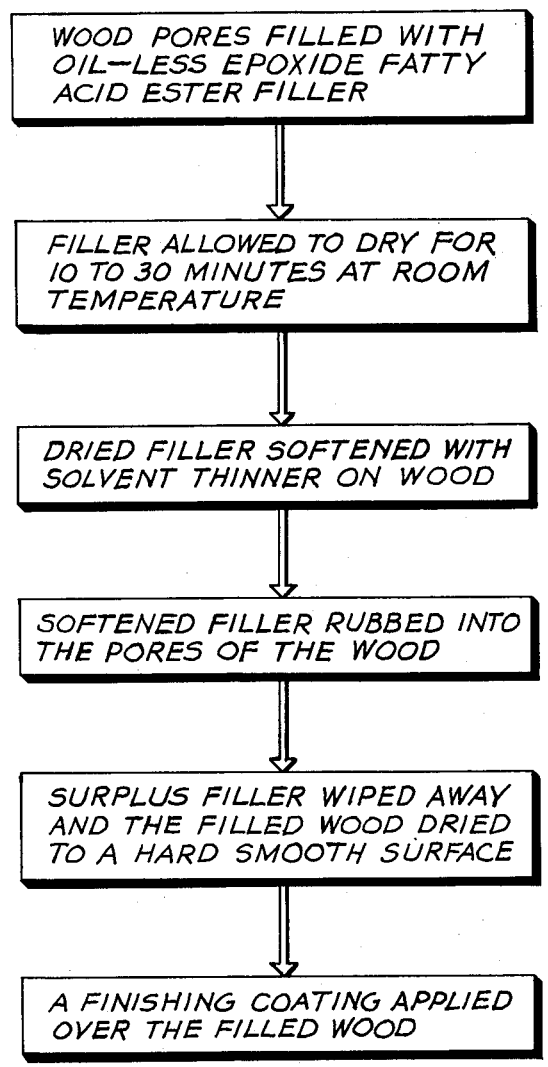
INVENTOR
BURTON E. LEDERMAN
BY *Toulmin & Toulmin*
ATTORNEYS

United States Patent Office 2,977,242
Patented Mar. 28, 1961

2,977,242

METHOD OF FILLING THE PORES OF WOOD AND RESULTANT ARTICLE

Burton E. Lederman, Dayton, Ohio, and Russel D. Hamilton, Grosse Pointe Farm, Mich., assignors to Chadeloid Corporation, Dayton, Ohio, a corporation of Delaware Filed Dec. 22, 1952, Ser. No. 327,423

4 Claims. (Cl. 117—64)

This invention relates to the art of wood finishing and more particularly to a novel vehicle for the inert ingredients of a wood filler composition and to a novel wood filler composition comprising the vehicle.

In finishing many woods, in order to obtain the perfectly smooth uniform surface for subsequent varnishing or lacquering so essential to a fine, high-quality final finish, a filler is applied to fill the pores in the wood and build up depressions therein so that the surface is leveled. The filler is applied, and then the surplus is removed by wiping. Since the filler is the foundation of the final finish, proper filling and wiping of the filled surface represent critically important operations in the finishing sequence.

The essential ingredients of a satisfactory paste wood filler are a suitable base or pigment, a non-volatile vehicle that also serves as a binder for the inert materials, and a volatile thinner.

Rapid drying, for example, a drying time of 10–30 minutes, is a requirement for economical large scale commercial wood finishing. Heretofore, the problem of the art has been that no filler vehicle has been available having both the property of quick-drying and the property of being resolubilized, reworked and wiped after it has dried to hard set condition. Certain types of linseed oil filler vehicles are re-workable to some extent but such vehicles require long drying times. Other of the known vehicles, notably those comprising shellac, are rapid drying but are not reworkable. Furthermore, the known vehicles tend to "bleed" when sealer and top coats are applied to the filled wood.

When a filler comprising shellac is used, there can be no appreciable time-lag between application of the filler composition and removal of the excess by wiping, so that the steps of applying the filler and wiping off the surplus must be carried out in immediate sequence, which is not always convenient. Also, when such fillers are applied to large surfaces, such as desks, table-tops, cabinets, etc., the filler at some portions of the surface may dry and set too hard for wiping while remaining portions of the surface are being wiped, and to meet this danger several operators may have to cooperate in wiping the different portions of the surface simultaneously. Various expedients for slowing the setting time of the known fillers, for instance, the inclusion of substantial amounts of wood flour, while effective, nevertheless leave much to be desired in the way of adequate control of the filling operation.

A primary object of the present invention is to provide a novel vehicle for the inert materials of a wood filler which permits reworking of the filler at any time between application thereof to the surface to be filled and the application of top-coats to the filled wood.

Another object is to provide a novel filler which is not leached out by subsequent overcoats of lacquer or varnish containing high solvency thinners.

The drawing represents a flow sheet of the process.

Another object is to provide quick-drying filling compositions comprising volatile thinners and the novel vehicle, which compositions can be applied to a wood surface to be filled, allowed to dry, re-solubilized, reworked, and wiped to remove the surplus at any time before application of other coating compositions, such as sealer, varnishing or lacquering top-coats to the surface.

We have found that when certain resinous film-forming polymeric polyhydric alcohols and esters thereof with non-drying and semi-drying saturated or substantially or nearly saturated aliphatic acids are used as the non-volatile vehicle for the inert materials of a wood-filler, the filler has the unique characteristic of being readily reworkable at any time after drying thereof so that working of the filler to fill the pores and removal of the excess by wiping can be performed even after the filler has dried and set to a hard condition. The dried, set filler in situ on or in the wood can be re-softened by working, as by rubbing, the filled surface with a volatile thinner, to pack the filler into the pores of the wood, level off the surface, and remove any surplus filler so that the surface is wiped clean. This eliminates the necessity for synchronizing the wiping time with application of the filler to ensure wiping off of the surplus before the filler dries and sets, and permits flexibility in the timing of the finishing sequence. The wood fillers of the invention, in which the inert materials of the filler are associated with vehicles constituted by the polymeric polyhydric alcohols or esters, and which do not contain shellac, thus have substantial advantages over the prior art wood filler compositions comprising shellac. Since they are also rapid-drying, they have substantial advantages over linseed oil-containing vehicles.

The polymeric polyhydric alcohols which are used as vehicles for the inert materials of the present wood filler compositions are preferably polymeric condensates of polyhydric phenols and polyfunctional alcohol-contributing reactants including polyhalo alcohols, epihalohydrins and polyepoxy compounds.

The polyhydric alcohol used in making the vehicle for the inert filler materials may be a mononuclear polyhydric phenol such as resorcinol, hydroquinone, catechol, phloroglucinol, etc., or it may be a polynuclear phenol such as bis-phenol (p,p' - dihydroxydiphenyldimethyl - methane), p,p' - dihydroxybenzophenone, p,p' - dihydroxydiphenol, p,p'-dihydroxydibenzyl, o,p,o',p'-tetrahydroxydiphenyl dimethyl methane, hematoxylin, polyhydric anthracenes, polyhydric naphthalenes, etc.

The polyfunctional alcohol-contributing reactant may be an epihalohydrin such as epichlorhydrin, epibromhydrin, epihalohydrins of mannitol, sorbitol, erythritol, etc., a polyhalohydrin such as glycerol dichlorhydrin, beta-methyl glycerol dichlorhydrin, mannitol or sorbitol dichlorhydrin, etc., or a polyepoxide compound such as bis-(2,3-epoxypropyl) ether, butylene dioxide, diepoxides of mannitol, sorbitol, etc.

In a more specific aspect of the invention, the vehicle is a resinous, film-forming polymeric condensate of a polynuclear phenol, specifically bis-phenol, and an epihalohydrin, which products may be broadly defined as resinous, film-forming polymeric polyether polyphenols which are polyether derivatives of polyhydric phenols having hydroxyl-containing aliphatic radicals united through ether linkages to the phenolic nuclei.

These polymeric condensates may be made by reacting the selected polyhydric phenol and alcohol-contributing reactant together under conditions generally known in the art until a resinous, film-forming condensate is obtained.

As typical of the polymeric condensates which may be used there may be mentioned those marketed by Shell Chemical Corporation under the trade names "Epon" 1001, "Epon" 1004, and "Epon" 1007. These are all polymeric condensates of bis-phenol and epichlorhydrin of varying molecular weight such that the condensates exhibit film-forming properties.

Although the vehicle of the wood filler composition may comprise the polymeric polyhydric alcohol per se, in the presently preferred modification of the invention, the vehicle is an ester of the polymeric polyhydric alcohol with an aliphatic acid of the drying or semi-drying type, and more specifically a saturated or substantially saturated aliphatic acid ester of a polymeric condensate of a polyhydric phenol, e.g., bis-phenol and an epihalohydrin. Saturated and nearly saturated aliphatic acid esters of the "Epon" resins mentioned above are satisfactory and typical of the preferred vehicles.

The saturated aliphatic acids which may be used in making the esters are those containing from 5 to 25 carbon atoms, i.e., the members of the saturated fatty acid series from isovaleric acid to behenic acid, and including, in addition to the acids just mentioned, caproic, caprylic, capric, lauric, myristic, palmitic, stearic and arachidic acids, as well as the semi-drying types of acids such as ricinoleic acid. At present, it is preferred to use those acids mentioned having the higher carbon content, for instance, those containing from 12 to 18 carbon atoms in the chain, palmitic acid being the most desirable. The acids may be used as such, in the pure condition, or in the form of their technical grades, that is, as they occur naturally in vegetable and animal fats and oils.

The esterified "Epons" or similar polymeric condensates as defined herein may be made by heating the resinous polymeric condensate and aliphatic acid in varying proportions, to elevated temperature, and maintaining the mass at the elevated temperature, with agitation thereof, until the reaction is complete and substantially all the acid is consumed. In general, it is preferred to esterify at least 10% of the hydroxyl groups present, it being understood that for purposes of esterification any epoxy groups present behave as glycol groups in reaction with organic acids, one epoxide group being in general equivalent to two alcoholic hydroxyl groups. The temperature at which the condensate and ester are heated may vary, depending on the particular reactants but the temperature is selected so that after a comparatively short heating time, of the order of about 4–6 hours, the ester is produced and the mass is characterized by high body or viscosity and a low acid number. Temperatures in the range between 480° F. and 540° F. are contemplated. A temperature of 480° F. to 500° F. has been found satisfactory.

After the condensate or ester thereof has been produced, there is added to it a solvent thinner or mixture of thinners in an amount to give a vehicle suitable for mixing with the wood filler pigments. After the addition of the thinner, the vehicle may have the form of a viscous mass having substantially no flow. This vehicle is subsequently mixed with the pigments and other inerts and reduced with additional thinner as required to produce a wood filler composition having the fluid consistency best adapted to the particular mode of application, whether that is to be by brushing, dripping or spraying.

The thinner added to the polymeric condensate or ester and used in reducing the pigmented mass to application consistency may be and preferably is an organic solvent which volatilizes rapidly at ordinary temperature and pressures. Preferably, such volatile solvents as VMP naphtha, lead-free gasoline, mineral spirits, xylol and turpentine are employed. Such solvents are of the type generally used for thinning paste wood fillers.

The final filler composition comprises the inert and pigmenting materials normally used in wood fillers. It may comprise translucent inert pigments such as silica and the silicates and carbonates of calcium and magnesium, of the type of asbestine, for instance, to fill the pores without staining the wood, or it may contain color pigments such as umbers, siennas and other which impart a desired color to the filler. Thus, the filler may contain pigments which render it darker in tone than the natural coloring of the wood or stain applied thereto, as is often desirable in filling oak, walnut and mahogany, or the filler may comprise pigments which render the filler lighter in shade than the natural color of the wood or of the wood after staining, particularly when contrasting finish effects such as a "pickled finish" is desired. It is also a more or less common practice to incorporate with wood fillers a pigment which renders the filler the same color and shade as the natural wood, so that the pores of the wood are not accentuated. Pigments of this last-mentioned type may also be incorporated in the vehicle of the invention.

The vehicle and additives may be mixed thoroughly together in any suitable apparatus, for example in a "pony" type mixer, and during such mixing additional thinner may be incorporated to reduce the filler to the desired final consistency, with dispersal of the inert materials in the vehicle. The thinners added at this point may be and preferably are the same as those added to the polymeric condensate or ester thereof in preparing the vehicle. Or the thinners may be incorporated with the product obtained by mixing the pigments with the vehicle.

The use of the polymeric polyhydric alcohols or esters as disclosed herein as vehicles for the inerts of the wood filler has a direct bearing on both the drying and wiping time. The filler dries by evaporation of the thinner under the prevailing temperature conditions, and thus the drying time is solely a function of the volatility or evaporation rate of the thinner. In general, the fillers dry very rapidly at normal or finishing room temperature.

In the past, using fillers comprising vehicles containing such pigment-cementing materials as shellac, prompt attention by the operator was required in order to ensure proper working of the filler into the pores of the wood and removal of the excess filler before it had dried and set to a hard condition. This was required because the filler was not reworkable and the filler could not be worked into the wood, nor the surplus removed satisfactorily after the filler was set, and meant that in filling large surfaces it was necessary, in order to avoid "muddiness," to restrict the area to which the filler was applied to that area which could be worked and wiped off before the filler lost its gloss and set to dried, hardened condition. The filling and wiping of large surfaces had to be done piecemeal.

An outstanding advantage of the present fillers is that they can be re-solubilized and reworked at any time after they are applied to the wood and prior to the application of other sealing and finishing coats. The filler may be applied to the entire surface of a table-top, for example, left to dry, and at some subsequent time the filler may be reworked and leveled, and the surplus removed, by applying sparing amounts of thinner to the surface, sufficient to moisten the dried filler, reworking the re-solubilized filler to fill in underfilled areas, and wiping the surface clean. Whereas attempts to rework prior art fillers in this manner have not met with success, the present filler can be reworked and wiped regardless of the time lapse between application of the filler and the reworking and wiping, to leave a perfectly smooth, clean filled surface such as is required for application of the sealer coat in order to obtain a high-quality finish.

In finishing wood, a sealer or wash coat is applied to the filled wood for the purpose of preventing excessive absorption of succeeding finish coats by the wood. In the past, using prior art fillers, considerable difficulty has been experienced with bleeding of the filler into the sealer coat, or with penetration of the sealer into the filler in the pores and consequent migration of the filler from the pores into the wet sealer. Often, the surface is marred by spots around the pores due to migration of filler comprising coloring matter out of the wood pores and into the sealer coat.

Another outstanding advantage of the fillers of this invention is that when a sealer coat is applied over the filled surface, there is no problem with bleeding or migration of the filler.

A further advantage of the vehicles of the invention is that they are capable of effectively binding a higher proportion of pigment than the vehicles known previously.

The filler may be applied to the surface of the wood in any convenient way, such as brushing, dipping or spraying under pressure, the last-mentioned method being particularly useful when the work is carried on a conveyor.

The following examples, in which the parts given are by weight unless otherwise specified, are illustrative of the invention.

Example I

About 100 parts of a film-forming resinous polymeric condensate of bis-phenol and epichlorhydrin (identical with Shell Chemical's "Epon" 1004) and 70 parts of palmitic acid were heated together to 480° F.–500° F. and held at that temperature, while being continuously stirred, for four hours, after which the mass was cooled to 400° F. and 170 parts of mineral spirits were added with thorough mixing. A resinous, high viscosity vehicle was thus obtained.

A sprayable filler composition was prepared by thoroughly mixing 56 parts of silex, 12 parts of kaolin, 10 parts of mineral spirits and 2 parts of xylol with 12.5 parts of the vehicle.

The filler was sprayed on a plain, unstained wood surface and allowed to dry thoroughly before wiping to remove the surplus. After the filler had set to hardened condition, it was re-solubilized by rubbing a cloth dampened with xylol over the filled surface, and reworked to level off the filler in the pores flush with the remaining portions of the surface. The surplus filler was then removed by wiping, leaving a smooth, clean surface to which, after the filler had again dried thoroughly, a sealer lacquer coat was applied. There was no migration or bleeding of the filler into the sealer coat.

Example II

Example I is repeated, except that the fluid filler composition is prepared by adding 10 parts of silex, 1 part of asbestine, and 0.5 part of zinc stearate to the vehicle in an amount such that the resulting paste is too stiff to permit the addition thereto of any further quantity of the inert mixture, and reducing the paste to sprayable consistency by the addition of a mixture of xylol and VMP naphtha.

Example III

Example I is repeated except that the vehicle is prepared by heating a mixture of 200 parts of a polymeric, resinous film-forming condensate of bis-phenol and epichlorhydrin (Shell Chemical's "Epon" 1004), and 180 parts of stearic acid to 480° F.–500° F., with stirring, maintaining the mass at the elevated temperature for four hours, stirring being continued, cooling the mass to 400° F. and adding thereto 380 parts of VMP naphtha.

Example IV

Example I is repeated except that the vehicle is prepared by heating a mixture of 200 parts of the resinous polymeric condensate "Epon" 1004 and 160 parts of stearic acid to 480° F.–500° F., with stirring, maintaining the mass at the elevated temperature for about four hours with continuous agitation, cooking the mass to 400° F. and then adding to the mass 360 parts of VMP naphtha.

Example V

Example I is repeated except that the vehicle is prepared by heating a mixture of 200 parts of the polymeric condensate "Epon" 1004 and 220 parts of stearic acid to a temperature between 480° F. and 500° F., holding the mass at the elevated temperature for about four hours while continuing the agitation, cooking the mass to about 400° F., and then adding 530 parts of VMP naphtha and 210 parts of "Velsicol" AD 21 (a proprietary technical grade chlordan) to it.

In practicing the invention, and especially when the filler is destined for application to a stained wood, the use of thinners which do not have a leaching effect on wood stains is indicated and for this reason, in filling stained wood, those vehicles which lend themselves to thinning with aliphatic thinners are preferred.

The examples illustrate compositions which have been found suitable for the present purposes. However, various modifications may be made in the vehicle. Depending on the particular condensate or ester used, solvents or thinners other than those mentioned may be used, such as esters and ketones of the type of ethyl acetate and acetone. Various other modifications may be made. For instance, the esterification of the polymeric condensate with the acids of drying or semi-drying type may be carried out in the presence of acids of a type different from the aliphatic saturated or nearly saturated acids, or in the presence of monomeric polyhydric alcohols. As an illustration, the esterification with the saturated or nearly saturated aliphatic acid may be carried out in the presence of relatively small amounts of rosin or glycerol, or both rosin and glycerol. The filler composition may comprise various adjuvants in addition to those mentioned above, including soluble resins, oils, etc. It may comprise raw linseed oil or blown castor oil for improved working properties. Small quantities of dye solutions may be incorporated in the vehicle.

As the film-forming component of the vehicle there may be used mixtures of two or more polymeric condensates of polyhydric phenols and epihalohydrins having different molecular weights, such as mixtures of "Epon" 1004 and "Epon" 1007, or mixtures of the esterified condensates. Likewise, mixed esters of the condensates with two or more of the saturated or nearly saturated aliphatic acids may be used.

The proportion of thinner mixed with the vehicle to obtain the final filler composition will depend on the mode of application thereof to the wood, a larger amount of thinner being used when the filler is to be applied by spraying than if it is to be brushed on the wood surface. In general, a composition suitable for application by brushing or dipping is obtained by mixing the paste and thinner in the proportions of ten to fourteen pounds of paste to one gallon of thinner. Compositions adapted for spray application may be obtained by mixing the vehicle and thinner in the proportions of six to ten pounds of the vehicle to one gallon of thinner.

It will be apparent that the present invention provides filler compositions comprising novel vehicles for the inerts which impart unique properties to the compositions, permitting re-solubilization, reworking and clean wipe-off of surplus filler at any time between application of the composition to the wood and the application of a sealer coat thereto. The fact that, after it has set, the filler may be successfully re-solubilized or softened to a reworkable condition and then wiped to remove any surplus and prepare the surface for the sealer coat is a unique advantage of the present compositions and introduces flexibility into the plant schedule by eliminating the need for careful timing and correlation of the filling and wiping steps. It also results in a smoother, more uniform filled surface since if the pores of the wood are not all filled flush with the remaining areas of the surface the defect can be readily remedied by resolubilizing and reworking the filler until all the pores are properly filled, an inestimable advantage whether the articles to be finished are conveyorized or not.

The invention thus provides fillers having the unusual combination of quick-drying, reworkability, non-grain-raising, no leaching of stains and resistance to leaching by overcoatings.

From the foregoing, it will be understood that this invention is susceptible to modification in order to adapt it to different usages and conditions and, therefore, it is desired to comprehend such modifications within this invention as may fall within the scope of the appended claims.

We claim:

1. In a method of filling the pores of unfinished wood and preparing the surface of the wood for finishing coats, the steps of applying to the surface of the wood, an oilless filler which sets to hardened condition in ten to thirty minutes at the temperatures normally prevailing in wood finishing rooms, said filler consisting essentially of (1) a vehicle the essential solid constituent of which is a resinous, film-forming ester of a condensate of a polyhydric phenol and epichlorhydrin with a saturated fatty acid containing 8 to 12 carbon atoms, and (2) a thinner that volatilizes rapidly at the temperatures normally prevailing in wood finishing rooms, and selected from the group consisting of VMP naphtha, lead-free gasoline, mineral spirits, xylol and turpentine, the filler consisting of 6 to 14 pounds of the vehicle per gallon of the thinner, drying the filler to a set, hardened condition and, at some time between drying and setting of the filler and the application of a finishing coat to the filled wood, treating the filler on the wood with one of said thinners to soften the same and render it reworkable, reworking the softened filler on the wood surface by rubbing, removing any surplus filler from the surface of the wood by wiping, and allowing the filled wood to stand at the temperature normally prevailing in wood finishing rooms for 10 to 30 minutes to thereby reset the filler in the hard condition.

2. As an article of manufacture wood finished in accordance with the method set forth in claim 1.

3. In a method of filling the pores of unfinished wood and preparing the surface of the wood for finishing coats, the steps of applying to the surface of the wood, an oilless filler which sets to hardened condition in ten to thirty minutes at the temperatures normally prevailing in wood finishing rooms, said filler consisting essentially of (1) a vehicle the essential solid constituent of which is a resinous, film-forming palmitate of a condensate of a polyhydric phenol and epichlorhydrin, and (2) a thinner that volatilizes rapidly at the temperatures normally prevailing in wood finishing rooms, and selected from the group consisting of VMP naphtha, lead free gasoline, mineral spirits, xylol and turpentine, the filler consisting of 6 to 14 pounds of the vehicle per gallon of the thinner, drying the filler to a set, hardened condition and, at some time between drying and setting of the filler and the application of a finishing coat to the filled wood, treating the filler on the wood with one of said thinners to soften the same and render it reworkable, reworking the softened filler on the wood surface by rubbing, removing any surplus filler from the surface of the wood by wiping, and allowing the filled wood to stand at the temperature normally prevailing in wood finishing rooms for 10 to 30 minutes to thereby reset the filler in the hard condition.

4. In a method of filling the poles of unfinished wood and preparing the surface of the wood for finishing coats, the steps of applying to the surface of the wood, an oilless filler which sets to hardened condition in ten to thirty minutes at the temperatures normally prevailing in wood finishing rooms, said filler consisting essentially of (1) a vehicle the essential solid constituent of which is a resinous, film-forming stearate of a condensate of a polyhydric phenol and epichlorhydrin, and (2) a thinner that volatilizes rapidly at the temperatures normally prevailing in wood finishing rooms and selected from the group consisting of VMP naphtha, lead-free gasoline, mineral spirits, xylol and turpentine, the filler consisting of 6 to 14 pounds of the vehicle per gallon of the thinner, drying the filler to a set, hardened condition and, at some time between drying and setting of the filler and the application of a finishing coat to the filled wood, treating the filler on the wood with one of said thinners to soften the same and render it reworkable, reworking the softened filler on the wood surface by rubbing, removing any surplus filler from the surface of the wood by wiping, and allowing the filled wood to stand at the temperature normally prevailing in wood finishing rooms for 10 to 30 minutes to thereby reset the filler in the hard condition.

References Cited in the file of this patent

UNITED STATES PATENTS

| | | |
|---|---|---|
| 2,553,718 | Newey et al. | May 22, 1951 |
| 2,615,007 | Greenlee | Oct. 21, 1952 |
| 2,615,008 | Greenlee | Oct. 21, 1952 |
| 2,630,395 | McCullough | Mar. 3, 1953 |
| 2,637,621 | Auer | May 5, 1953 |

OTHER REFERENCES

Paint, Oil and Chemical Review, vol. 113, No. 23, Nov. 9, 1950 (pages 15–18, 48, 49).

Ciba Publication Araldite, Mar. 13, 1952.